United States Patent

Walker

[15] 3,638,399
[45] Feb. 1, 1972

[54] PROCESS FOR THE PURIFICATION OF HYDROCARBON PYROLYSIS GAS STREAMS

[72] Inventor: David G. Walker, Baytown, Tex.
[73] Assignee: Tenneco Chamicals Inc.
[22] Filed: Apr. 6, 1970
[21] Appl. No.: 26,062

[52] U.S. Cl. .......................................... 55/59, 55/63, 55/74, 260/679 A
[51] Int. Cl. ................................ B01d 53/04, C07c 11/24
[58] Field of Search ............... 55/59, 63, 74, 387; 260/679 A

[56] References Cited

UNITED STATES PATENTS

| | | | |
|---|---|---|---|
| 1,806,419 | 5/1931 | Rahn | 260/679 A |
| 1,815,554 | 7/1931 | Engelhardt | 55/59 |
| 2,554,908 | 5/1951 | Hirschler | 260/679 A |

FOREIGN PATENTS OR APPLICATIONS

| | | | |
|---|---|---|---|
| 659,603 | 3/1963 | Canada | 55/63 |

Primary Examiner—Charles N. Hart
Attorney—Daniel J. Reardon, George E. Lilly and Evelyn Berlow

[57] ABSTRACT

Acetylene-containing pyrolysis gases are purified by contacting them with activated carbon. In this process the activated carbon adsorbs triacetylene and other polyacetylene precursors and catalyzes their polymerization and at the same time adsorbs naphthalene and other foulants that are present in the gas stream.

7 Claims, No Drawings

PROCESS FOR THE PURIFICATION OF HYDROCARBON PYROLYSIS GAS STREAMS

This invention relates to a process for the purification of hydrocarbon pyrolysis gases. More particularly, it relates to a process for the removal of triacetylene and other foulants from acetylene-containing pyrolysis gas streams.

The high-temperature pyrolysis of hydrocarbons yields acetylene, hydrogen, carbon dioxide or carbon monoxide, and small amounts of other unsaturated hydrocarbons that contain from two to 10 or more carbon atoms. Among the unsaturated hydrocarbons formed are highly reactive compounds that polymerize spontaneously during the processing of the gas and particularly when the gas is compressed. The principal polymer formers in hydrocarbon pyrolysis gas are triacetylene and other unsaturated hydrocarbons that contain six carbon atoms. The concentration of these compounds in the pyrolysis gas is generally in the range of about 5 p.p.m. to 50 p.p.m. The polymerization of these compounds is the cause of a perennial and costly fouling problem in acetylene plants. Fouling problems in acetylene plants are also caused by the condensation and deposition of the higher molecular weight components of the pyrolysis gas, such as naphthalene, in cold areas of the plants.

In accordance with this invention, it has been found that both the polymer precursors and the higher molecular weight compounds that cause fouling problems can be removed from hydrocarbon pyrolysis gas by contacting the gas with activated carbon. The carbon treatment removes all of the polymer precursors from the pyrolysis gas by adsorption and catalyzes their polymerization. At the same time it quantitatively removes naphthalene and other foulants from the gas by adsorption. Pyrolysis gas that has been treated in this way is entirely free from foulants and may be processed without the fouling problems that are ordinarily associated with such pyrolysis processes.

While the process of this invention can be used for the purification of a variety of hydrocarbon pyrolysis gases, it is of particular value in the removal of triacetylene, naphthalene, and other foulants from acetylene-containing gases obtained by the high-temperature pyrolysis of methane.

In the practice of this invention, a pyrolysis gas stream is passed through a column packed with activated carbon at a space velocity of about 40 feet to 100 feet per minute until polymer precursors appear in the treated gas. The saturated carbon is replaced by fresh carbon and the purification of the gas is continued.

Since the temperature and pressure under which the process is carried out are not critical, the carbon treatment of the pyrolysis gas is ordinarily carried out under ambient conditions. If desired, the purification of the gas can be carried out at higher or lower temperatures and pressures. During the treatment of the pyrolysis gas with activated carbon, the gas leaving the carbon bed is analyzed at frequent intervals to determine whether or not it contains spontaneous polymer formers. The following test is used for this purpose: Thirty liters of pyrolysis gas are fed slowly at atmospheric pressure across a dry-ice cooled trap which is maintained under subatmospheric pressure. The material remaining in the trap is transferred to a small tube that has been cooled in liquid nitrogen, and the tube is sealed while its contents are under vacuum. The sealed tube is then warmed to room temperature. At this time it contains an aqueous phase and a small oil phase. After 12 hours at room temperature, the contents of the tube are examined. The presence in the tube of a brown polymer indicates that the test gas contained triacetylene or another polymer precursor.

The appearance of triacetylene or other polymer precursors in the treated gas is an indication that the surface of the activated carbon has been saturated with benzene, xylenes, toluene, styrene, phenylacetylene, naphthalene, and polyacetylene. The saturated carbon may be reactivated by heating it with steam or inert flue gas at a temperature in the range of 150° to 500° C., and preferably 250° to 425° C., to remove the $C_6$ to $C_{10}$ hydrocarbons from it. Carbon reactivated in this way may be returned to the carbon bed and used in the process of this invention to adsorb additional amounts of the $C_6$ to $C_{10}$ hydrocarbons from the pyrolysis gas stream and to catalyze the polymerization of adsorbed triacetylene and other polymer precursors. The carbon may be repeatedly used in this process and reactivated until its residual adsorption capacity for benzene has fallen to about 3 percent by weight, which indicates that a sizeable portion of the surface of the carbon has been inactivated by deposition of polyacetylene. At this point the inactivated carbon may be heated with steam or inert flue gas at a temperature in the range of about 700° to 1,100° C., and preferably 900° to 1,100° C., until substantially all of the polyacetylene deposited on its surface has been decomposed into carbon, hydrogen, methane, and small amounts of higher paraffins. The carbon reactivated in this way, which has an adsorption capacity at ambient temperature for benzene of at least 15 percent, can be used in the purification of additional amounts of pyrolysis gas. In the heat treatments of the carbon to remove adsorbed compounds and polyacetylene, the time required to achieve the desired reactivation of the carbon at the lower temperatures in the indicated ranges is greater than that required when higher temperatures are used.

The activated carbons that may be used in the process of this invention are prepared by heating a carbonaceous material of vegetable, animal, or mineral origin at temperatures above 400° C. until the material is completely carbonized. Among the materials from which the activated carbons may be prepared are coal, coconut shells, wood dust, peat, petroleum residues, and the like. The carbon should have an initial adsorption capacity for carbon tetrachloride at ambient temperatures of at least 8 percent, since those of lower capacity are deactivated too rapidly to be economically practical. High surface area carbons that have an initial adsorption capacity for carbon tetrachloride of 50 percent or more are not ordinarily used in the process of this invention because they add to the cost of the process without providing a corresponding improvement in its efficiency. The activated carbon is usually employed as a finely divided powder having a particle size of about 10 to 200 mesh. Since the destruction of available surface area by deposition of polyacetylene is greater when carbons with narrow pores (15 to 25 A.) are used, it is preferred that the carbons have a wide range of pore diameters and contain at least 50 percent of pores having diameters greater than 25 A. Particularly good results have been obtained using activated carbon prepared by heating coal in steam at 700°–900° C. One such material, which is marketed as Pittsburgh Type SGL, has the following characteristics:

| Particle Size | 8×30 (U.S. Sieve Series) |
|---|---|
| Density | 0.48 g./ml. |
| Total Pore Volume | 0.85 ml./g. |
| Pore Volume Distribution (%) | |
| >25 A. | 67 |
| 15–25 A. | 15 |
| <15 A. | 18 |

The quantity of activated carbon used is not critical and depends to a large extent on the amount of polymer formers and other foulants that are present in the gas.

The process is ordinarily carried out by passing the pyrolysis gas through standard carbon-packed columns. A plurality of columns is used, so that the carbon in one column can be reactivated while another column is on stream.

The invention is further illustrated by the examples that follow.

EXAMPLE 1

A hydrocarbon pyrolysis gas was purified by passing it at ambient temperature and atmospheric pressure through a 1-inch diameter column that contained 100 grams of activated carbon (Pittsburgh Type SGL). The gas was passed through the column at the rate of 40 feet to 100 feet per minute gas flow across the carbon bed. The pyrolysis gas had the following composition:

| Formula | Compound | Concentration (Moles per Million Moles Gas) |
| --- | --- | --- |
| $C_2H_2$ | Acetylene | 72,000 |
| $CO_2$ | Carbon dioxide | 27,400 |
| $C_2H_4$ | Ethylene | 3,600 |
| $C_3H_4$ | Methylacetylene = allene | 1,430 |
| $C_4H_2$ | Diacetylene | 1,150 |
| $C_4H_4$ | Vinylacetylene | 650 |
| $C_6H_6$ | Benzene | 200 |
| $C_6H_2$ | Triacetylene | 12 |
| $C_6H_4$ | Hexenediyne | 2.8 |
| $C_7H_8$ | Toluene | 5.4 |
| $C_8H_2$ | Tetracetylene | 0.3 |
| $C_8H_6$ | Phenylacetylene | 17 |
| $C_8H_8$ | Styrene | 0.8 |
| $C_8H_{10}$ | Xylenes | 0.2 |
| $C_{10}H_8$ | Naphthalene | 180 |

During the treatment of the pyrolysis gas with activated carbon, the gas leaving the carbon bed was analyzed at frequent intervals. The analytical data obtained showed the following: At the start of the treatment methylacetylene, allene, diacetylene, and vinylacetylene were adsorbed quantitatively by the activated carbon as were all of the higher molecular weight compounds. After a short time, the $C_3$ and $C_4$ compounds appeared in the treated gas; the concentration of these compounds in the treated gas soon reached the same level as in the feed gas. Considerably later benzene appeared in the treated gas. At this time and earlier in the process, a test for spontaneous polymerization that was applied to the treated gas showed that no spontaneous polymer formers were present in the treated gas. After benzene, the next compound to appear in the treated gas was triacetylene. A test that was made on the treated gas at that time showed spontaneous polymerization. This demonstrated that spontaneous polymerization in this hydrocarbon pyrolysis gas was largely or wholly due to the presence of triacetylene in the gas. After triacetylene, toluene, phenylacetylene, and naphthalene appeared in the treated gas in this order.

EXAMPLE 2

A hydrocarbon pyrolysis gas similar in composition to that used in example 1 was passed through a column that contained 100 grams of activated carbon (Pittsburgh Type SGL) until triacetylene appeared in the treated gas stream. The carbon that had been used to treat the gas was replaced by fresh activated carbon, and the purification of the pyrolysis continued with each 100 gram portion of activated carbon being replaced as soon as it was saturated with triacetylene. The pyrolysis gas purified in this way contained substantially no triacetylene, naphthalene, or other foulants that are ordinarily found in acetylene gas streams.

EXAMPLE 3

An acetylene pyrolysis gas that was similar in composition to that described in example 1 was cooled to the temperature of liquid nitrogen. The portion of the gas that was nonvolatile at this temperature was brought into contact with activated carbon at room temperature. The treated carbon was placed in an environment whose pressure was less than 1 mm. of mercury. Application of full vacuum and slight warming resulted in the evolution of the compounds that had been adsorbed by the carbon. Benzene, toluene, and vinylacetylene were recovered in essentially quantitative yield from the carbon. Less than 5 percent of the triacetylene that was present in the gas with which the carbon had been contacted was recovered even after the carbon had been subjected to full vacuum and to heating. The same effect was noted even when the adsorbed gas had been left on the carbon at room temperature for less than 5 minutes. These tests demonstrated that triacetylene which is stable in the gas phase is rapidly and quantitatively polymerized to a nonvolatile product when it is physisorbed on a carbon surface at room temperature.

EXAMPLE 4

A 100-gram portion of activated carbon was used to purify a hydrocarbon pyrolysis gas by the procedure described in example 1. When triacetylene appeared in the treated gas, the saturated carbon column was replaced with a column containing fresh activated carbon, and the purification of the pyrolysis gas was continued.

The saturated carbon was heated in inert flue gas at 250° to 300° C. until all of the adsorbed benzene, toluene, phenylacetylene, and naphthalene had volatilized. The carbon was cooled to room temperature and subsequently placed on stream to purify more pyrolysis gas. The amount of gas that was purified with the reactivated carbon before triacetylene appeared in the treated gas was substantially the same as that which was purified with the same amount of carbon that had not previously been used in the process.

EXAMPLE 5

A 100-gram portion of activated carbon was used in a number of gas purification-reactivation cycles similar to that described in example 4. In each cycle the carbon was used to purify a hydrocarbon pyrolysis gas until triacetylene appeared in the treated gas and was then purged by inert flue gas at about 300° to 350° C. The cycles were repeated until the carbon had a residual adsorption capacity of 3 weight percent for benzene, which indicated that a sizeable portion of its surface had been inactivated by deposits of polyacetylene.

The carbon was heated in a stream of steam at 900° to 1,000° C. until substantially all of the polyacetylene on its surface had been decomposed. The carbon treated in this way, which had an adsorption capacity for benzene of more than 15 percent at ambient temperature, was placed on stream and used to purify additional amounts of hydrocarbon pyrolysis gas.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. The process for the purification of acetylene-containing pyrolysis gas streams that comprises the following steps:
   a. Passing a hydrocarbon pyrolysis gas stream that comprises acetylene, triacetylene, naphthalene, and other unsaturated hydrocarbons having from six to 10 carbon atoms through a bed of activated carbon until triacetylene appears in the treated gas;
   b. Replacing the saturated carbon with fresh activated carbon and repeating step (a);
   c. Reactivating the saturated carbon by heating it at a temperature in the range of about 150° to 500° C. until the naphthalene and other stable hydrocarbons having from six to 10 carbon atoms have been removed from its surface;
   d. Repeating steps (a), (b), and (c) until the carbon reactivated in step (c) has a residual adsorption capacity for benzene of about 3 percent by weight at ambient temperature;
   e. Reactivating the carbon resulting from step (d) by heating it at a temperature in the range of about 700° to 1,100° C. until substantially all of the polymer deposited on its surface has been decomposed; and
   f. Repeating steps (a), (b), (c), (d), and (e).

2. The process of claim 1 wherein the activated carbon used in step (a) has an initial adsorption capacity for carbon tetrachloride of at least 8 percent at ambient temperature.

3. The process of claim 1 wherein in step (c) the carbon is heated in inert gas at a temperature in the range of 250° to 500° C. to reactivate it.

4. The process of claim 1 wherein in step (c) the carbon is heated in steam at a temperature in the range of 250° to 500° C. to reactivate it.

5. The process of claim 1 wherein in step (e) the carbon is heated in inert gas at a temperature in the range of 900° to 1,000° C. to reactivate it.

6. The process of claim 1 wherein in step (e) the carbon is heated in steam at a temperature in the range of 900° to 1,000° C. to reactivate it.

7. In the process for the purification of a hydrocarbon pyrolysis gas that contains a major amount of acetylene and minor amounts of triacetylene, naphthalene, and other unsaturated hydrocarbons having from six to 10 carbon atoms that comprises the steps of (a) passing said hydrocarbon pyrolysis gas through a bed of activated carbon until triacetylene appears in the treated gas, (b) reactivating the saturated carbon by heating it at a temperature in the range of about 250° to 425° C. and (c) repeating steps (a) and (b) until the reactivated carbon has a residual adsorption capacity for benzene of about 3 percent by weight at ambient temperature, the improvement that comprises heating the carbon resulting from step (c) in an inert gas at a temperature in the range of about 700° to 1,100° C. until substantially all of the polyacetylene on its surface has been decomposed and thereby reactivating it.

* * * * *

UNITED STATES PATENT OFFICE
CERTIFICATE OF CORRECTION

Patent No. U.S. 3,638,399      Dated Feb. 1, 1972

Inventor(s) David G. Walker

It is certified that error appears in the above-identified patent and that said Letters Patent are hereby corrected as shown below:

Column 3, line 9, change "methylacetylene=allene" to -- methylacetylene + allene --.

Signed and sealed this 6th day of June 1972.

(SEAL)
Attest:

EDWARD M. FLETCHER, JR.
Attesting Officer

ROBERT GOTTSCHALK
Commissioner of Patents